Patented Dec. 14, 1943

2,336,501

UNITED STATES PATENT OFFICE 2,336,501

ALDEHYDE REACTION PRODUCT OF DIAMINO-DIPHENYL-SULPHONE

George W. Raiziss, Philadelphia, Pa., assignor to Abbott Laboratories, North Chicago, Ill., a corporation of Illinois No Drawing. Application March 14, 1938, Serial No. 195,827

1 Claim. (Cl. 260—397.6)

The present invention relates to aldehyde reaction products of diamino diphenyl sulphone. The products of my invention possess therapeutic effects of great intensity and are particularly adaptable for use in combating streptococcic and like infections.

The diamino diphenyl sulphone used in preparing my improved compositions may be represented by the following formula:

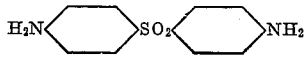

I have discovered that aldehyde bodies containing the monovalent —CHO radical react with the amino groups of diamino diphenyl sulphone to produce various reaction products having potent therapeutic effects. The aldehydes suitable for use in my invention include saturated aliphatic aldehydes of straight and branched chains such as formaldehyde, acetaldehyde, propylaldehyde, butylaldehyde, amylaldehyde, heptylaldehyde, isobutylaldehyde, isoamylaldehyde, β-ethyl-propylaldehyde and the like; as well as unsaturated aliphatic aldehydes such as acrylaldehyde (acrolein), crotonaldehyde, etc. The aldehydes suitable for use in my invention also include aromatic aldehydes such as benzaldehyde as well as the aralkyl aldehydes in which the alkyl or aliphatic hydrocarbon group is saturated or unsaturated such as phenylacetaldehyde, phenyl-propylaldehyde, cinnamaldehyde and the like.

My invention also includes the use of substituted aromatic aldehydes and particularly hydroxy, amino, alkyl and alkoxy phenyl substituted aromatic aldehydes. Examples of substituted aromatic aldehydes include salicylaldehyde, 3-methoxy, 4-hydroxy-benzaldehyde, anisaldehyde, 4-methyl benzaldehyde, amino-benzaldehydes, etc. In addition, my invention includes both the mono- and di-aldehyde reaction products, the mono-products comprising the compositions formed employing molecular equivalents of aldehyde and diamino diphenyl sulphone and the di-products comprising the compositions formed employing two molecular equivalents of aldehyde and one molecular equivalent of diamino diphenyl sulphone. The mono-products contain a free amino group and one —CH=N— group, while the di-products contain two —CH=N— groups.

The following examples will serve to illustrate my invention.

EXAMPLE I

*P,p'-di-(2-hydroxy benzylidenamino) diphenyl sulphone*

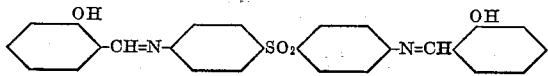

To the mixture of 10 cc. of water and 20 cc. methyl alcohol are added 2.7 grams of salicylaldehyde. The mixture is cooled to about 10° C. and while stirring, a solution of 2.5 grams diamino diphenyl sulfone in 8 cc. of methyl alcohol is slowly added. A precipitate is soon formed and the mixture is stirred for about 30 minutes while it is cooled to 0° C. The precipitate is then filtered off and washed with an ice cold mixture of equal quantities of methyl alcohol and water. This di- product p,p' di(2-hydroxy benzylidenamino) diphenyl sulphone is soluble in ethyl alcohol but is insoluble in water, hydrochloric acid and sodium hydroxide.

EXAMPLE II

*P-benzylidenamino, p'-amino diphenyl sulphone*

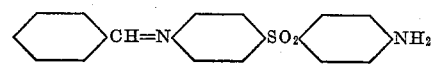

This mono-product may be prepared in accordance with the general process of Example I employing molecular equivalents of diamino diphenyl sulphone and benzaldehyde.

EXAMPLE III

*P,p'-diethylidenamino diphenyl sulphone*

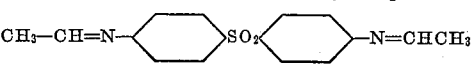

This product may be prepared in accordance with the process of Example I employing acetaldehyde.

EXAMPLE IV

*P,p'-di-(4-hydroxy-3 methoxy-benzylidenamino) diphenyl sulphone*

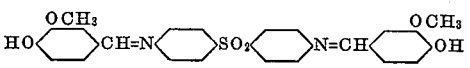

This product may be prepared in accordance with the process of Example I employing 3-methoxy-4-hydroxy-benzaldehyde.

EXAMPLE V

*P,p'-di-(4-methoxy-benzylidenamino) diphenyl sulphone*

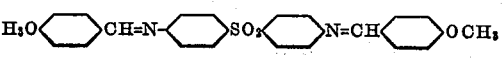

This product may be prepared in accordance with the process of Example I employing anisaldehyde.

Example VI

*P,p'-di-(phenylpropylidenamino) diphenyl sulphone*

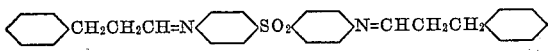

This product may be prepared in accordance with the process of Example I employing hydrocinnamaldehyde.

Example VII

*P,p'-di-(phenylallylidenamino) diphenyl sulphone*

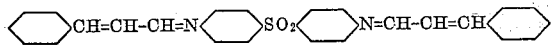

This product may also be prepared by the process of Example I using cinnamaldehyde.

Example VIII

*P,p'-di-phenylethylidenamino diphenyl sulphone*

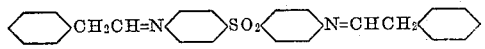

This product may also be prepared by the process of Example I using phenylacetaldehyde.

Example IX

*P,p'-di-(4-methyl-benzylidenamino) diphenyl sulphone*

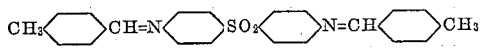

This product may also be prepared by the process of Example I using 4-methyl-benzaldehyde.

Example X

*P,p'-di-butylidenamino diphenyl sulphone*

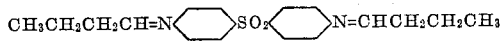

This product may also be prepared by the process of Example I using butylaldehyde.

Example XI

*P,p'-di-propylidenamino diphenyl sulphone*

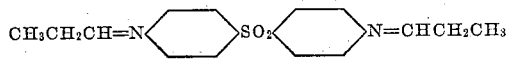

This product may be prepared in accordance with the process of Example I using propylaldehyde.

Example XII

*P,p'-di-heptylidenamino diphenyl sulphone*

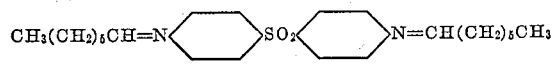

This product may be prepared in accordance with the process of Example I using heptylaldehyde.

My investigations have shown the di-products in which both amino groups of the diamino diphenyl sulphone have reacted with the aldehyde to be preferred over the mono-products in which only one amino group of the diamino diphenyl sulphone has reacted with the aldehyde. A di-product is illustrated in Example I while a mono-product is illustrated in Example II. My investigations have also shown the aliphatic aldehydes of the general type of acetaldehyde and higher homologues to be the preferred aliphatic aldehydes for use in my invention. My investigations have also shown the hydroxy-aromatic aldehydes such as ortho hydroxy benzaldehyde to be the preferred aromatic aldehydes for use in my invention.

It will be understood by those skilled in the art that my invention is not limited to the above illustrative examples. For example, my invention includes the use of various other saturated and unsaturated aliphatic aldehydes. In addition, my invention includes the use of aromatic aldehydes in which the phenyl ring contains a multiple of hydroxy groups as well as phenyl groups containing various alkyl groups such as ethyl, propyl, butyl and particularly the amyl groups or alkoxy groups of a like nature. My invention also includes mixed di-products of diamino diphenyl sulphone in which the amino groups of the diphenyl sulphone have been reacted with unlike aldehydes.

In the preparation of some of the products of my invention I have found that a partial evaporation of the alcoholic reaction medium aids in the precipitation of the aldehyde reaction product. In the purification of some of the reaction products I have also found it desirable to treat the precipitate with small quantities of ether which removes unreacted aldehyde, and then wash the precipitate with several portions of alcohol, preferably by suspending the precipitate in alcohol and filtering.

All modifications coming within the spirit and scope of my invention are intended to be covered by the following claim.

I claim:

The product, p,p'-di(phenylpropylidenamino)-diphenyl sulphone having the following formula:

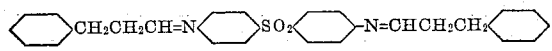

GEORGE W. RAIZISS.